United States Patent
Nackers et al.

(10) Patent No.: US 9,169,926 B2
(45) Date of Patent: Oct. 27, 2015

(54) SYSTEM AND METHOD OF OPERATING A MACHINE HAVING A CONTINUOUSLY VARIABLE TRANSMISSION

(71) Applicant: Caterpillar Inc., Peoria, IL (US)

(72) Inventors: Adam Nackers, East Peoria, IL (US); Kevin Davis, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 225 days.

(21) Appl. No.: 13/666,642

(22) Filed: Nov. 1, 2012

(65) Prior Publication Data

US 2014/0121919 A1   May 1, 2014

(51) Int. Cl.
 *B60W 10/101* (2012.01)
 *F16H 61/462* (2010.01)
 *F16H 47/04* (2006.01)

(52) U.S. Cl.
 CPC .............. *F16H 61/462* (2013.01); *F16H 47/04* (2013.01)

(58) Field of Classification Search
 None
 See application file for complete search history.

(56) References Cited

U.S. PATENT DOCUMENTS

| | | | |
|---|---|---|---|
| 4,056,176 A | 11/1977 | Förster et al. | |
| 5,154,267 A | 10/1992 | Watts | |
| 5,389,051 A | 2/1995 | Hirate et al. | |
| 5,526,261 A | 6/1996 | Kallis et al. | |
| 6,217,477 B1 | 4/2001 | Nobumoto et al. | |
| 6,223,592 B1 | 5/2001 | Genise | |
| 6,240,356 B1 | 5/2001 | Lapke | |
| 6,330,873 B1 * | 12/2001 | Letang et al. | 123/322 |
| 6,347,680 B1 | 2/2002 | Mianzo et al. | |
| 6,385,970 B1 | 5/2002 | Kuras et al. | |
| 6,388,407 B1 | 5/2002 | Eguchi | |
| 6,474,186 B1 | 11/2002 | Vollmar | |
| 6,817,338 B2 | 11/2004 | Janic et al. | |
| 7,192,374 B2 | 3/2007 | Kuras et al. | |
| 7,296,496 B2 | 11/2007 | Shah | |
| 7,400,964 B2 | 7/2008 | Shiiba et al. | |
| 7,401,542 B2 | 7/2008 | Stephens et al. | |
| 7,641,588 B2 | 1/2010 | Thomson et al. | |
| 7,669,580 B2 | 3/2010 | Silbernagel et al. | |
| 7,762,923 B2 | 7/2010 | Schuh et al. | |
| 7,894,968 B2 | 2/2011 | Stroh et al. | |
| 7,972,240 B2 | 7/2011 | Janasek | |
| 8,070,651 B2 | 12/2011 | Eastman et al. | |
| 8,216,109 B2 | 7/2012 | Dahl et al. | |
| 8,694,217 B2 * | 4/2014 | Fleming et al. | 701/55 |
| 2007/0142170 A1 * | 6/2007 | Kanafani et al. | 477/110 |
| 2008/0172162 A1 | 7/2008 | Wegeng et al. | |
| 2008/0215217 A1 * | 9/2008 | Unno | 701/54 |

(Continued)

FOREIGN PATENT DOCUMENTS

| | | |
|---|---|---|
| EP | 1640640 A1 | 3/2006 |
| JP | 01-244930 A | 9/1989 |
| JP | 2010-078089 A | 4/2010 |

*Primary Examiner* — John Q. Nguyen
*Assistant Examiner* — Abdhesh Jha
(74) *Attorney, Agent, or Firm* — Leydig, Voit & Mayer, Ltd.

(57) ABSTRACT

A system and method involves a machine that powertrain including a continuously variable transmission (CVT) and a machine speed sensor to determine a measured machine speed. The machine also includes a controller in communication with the CVT and the speed sensor. The controller may include a table relating the measured machine speed to a plurality of virtual gear ratios associated with the CVT. The controller is configured to determine a calculated virtual gear ratio using the table and, if desired, may display the calculated virtual gear ratio on a visual display.

13 Claims, 6 Drawing Sheets

(56) References Cited

U.S. PATENT DOCUMENTS

| | | |
|---|---|---|
| 2009/0088936 A1 | 4/2009 | Hubbard et al. |
| 2009/0112424 A1 | 4/2009 | Dahl et al. |
| 2010/0137102 A1 | 6/2010 | Sopko, Jr. et al. |
| 2011/0088961 A1 | 4/2011 | Case et al. |
| 2011/0178684 A1* | 7/2011 | Umemoto et al. ............... 701/51 |
| 2011/0301793 A1 | 12/2011 | Hsieh et al. |
| 2012/0083976 A1 | 4/2012 | Fleming et al. |
| 2012/0136548 A1* | 5/2012 | Hoff ................................ 701/93 |
| 2014/0122700 A1* | 5/2014 | Jung et al. ..................... 709/224 |

* cited by examiner

SYSTEM AND METHOD OF OPERATING A MACHINE HAVING A CONTINUOUSLY VARIABLE TRANSMISSION

TECHNICAL FIELD

The present disclosure relates generally to a machine equipped with a continuously variable transmission (CVT) and, more particularly, to a CVT adapted to operate in one or more discrete, virtual gear ratios.

BACKGROUND

Many machines use transmissions to couple the output of a prime mover or power source, for example, an internal combustion engine, to a driven element or device such as wheels or a work implement. Traditional transmissions typically included one or more fixed, selectably engageable gear ratios that could increase or decrease the speed of the prime mover and, usually in an inverse relationship, the torque. Specific gear ratios often correspond to discrete and known speed ranges of the driven device such that selection of a specific gear ratio will enable operation of the driven device within the that speed range. Accordingly, changing the desired speed and/or torque may require changing gear ratios that may be done in a step-controlled manner, i.e., gearing up or gearing down. Many operators of these machines have become accustomed to using traditional transmissions because they provide reliability and repeatability in operating the machine and, particularly, the driven device. For example, an operator may know that high gears are better suited for high-speed, low drag travel and lower gears are better suited for hauling operations or acceleration.

Recently, some manufacturers have equipped certain machines with continuously variable transmissions (CVTs) instead of the conventional, gear-based transmissions. A CVT provides an infinite or continuous range of torque-to-speed output ratios with respect to any given input from the prime mover. In other words, the output of the CVT may be increased or decreased across a continuous range in almost infinitesimally small increments. Thus, a CVT does not engage specific, discrete gear ratios to determine or control its output. However, some operators have expressed discomfort with CVTs because they lack the selectable and predicable gear ratios of conventional gear-based transmissions.

U.S. Pat. No. 7,641,588 ("the '588 patent"), assigned to the assignee of the present application, describes one approach to remedying or reducing operator discomfort and unfamiliarity with CVTs. According to the '588 patent, an electronic or computer-aided controller may be operatively associated with the CVT and/or the prime mover. The controller is configured to regulate or limit operation of those devices within distinct output ranges provided by a plurality of discrete, predetermined speed ranges that an operator may selectively engage. The '558 patent thus provides virtual gear ratios resembling the actual gear ratios employed in conventional transmissions. The present disclosure is directed to furthering implementation and coordination of the virtual gear methodology with CVTs and to improving user operability of machines equipped with such capabilities.

SUMMARY

The disclosure describes, in one aspect, a machine having a continuously variable transmission and a machine speed sensor for determining a measured machine speed. The machine also includes a controller in communication with the continuously variable transmission and the speed sensor. The controller may include a table relating the measured machine speed to a plurality of virtual gear ratios associated with the continuously variable transmission. The controller is configured to determine a calculated virtual gear ratio using the table.

In another aspect, the disclosure describes a method of operating a machine having a power source operatively coupled to a continuously variable transmission. The method involves selecting a selected virtual gear ratio from a plurality of virtual gear ratios associated with the continuously variable transmission. The method may operate the machine in accordance with the selected virtual gear ratio. To facilitate operation of the machine, the method may also measure a machine speed and compare the measured machine speed to a table to determine a calculated virtual gear ratio.

In yet another aspect, the disclosure describes a controller for controlling a machine including a continuously variable transmission. The controller includes a communication link to a machine speed sensor measuring a measured machine speed. The controller has data for a plurality of virtual gear ratios associated with the continuously variable transmission, with each virtual gear ratio having an associated minimum virtual gear speed and an associated maximum virtual gear speed. The controller also includes a reverse lookup table correlating the measured machine speed to a calculated virtual gear ratio by referencing the maximum virtual gear speed.

DETAILED DESCRIPTION

This disclosure relates to a machine equipped with a continuously variable transmission (CVT) to operatively couple and transfer mechanical power from a prime mover power source to a driven element. CVTs may be sometimes be referred to as infinitely variable transmissions (ITVs), however, the disclosure relates to both transmissions and any similar type of transmission regardless of nomenclature. As used herein, the term "machine" may refer to any type machine that performs some operation associated with an industry such as mining, construction, farming, transportation, or any other industry known in the art. Moreover, an implement may be connected to the machine. Such implements may be utilized for a variety of tasks, including, for example, loading, compacting, lifting, brushing, and include, for example, buckets, compactors, fork lifting devices, brushes, grapples, cutters, shears, blades, breakers/hammers, augers, and others. For example, the machine may be an earth-moving machine, such as a wheel loader, excavator, dump truck, backhoe, motor grader, material handler or the like. Additionally, the machine may be used in the transportation field such as on-highway trucks, cargo vans, or the like.

Figure 1:
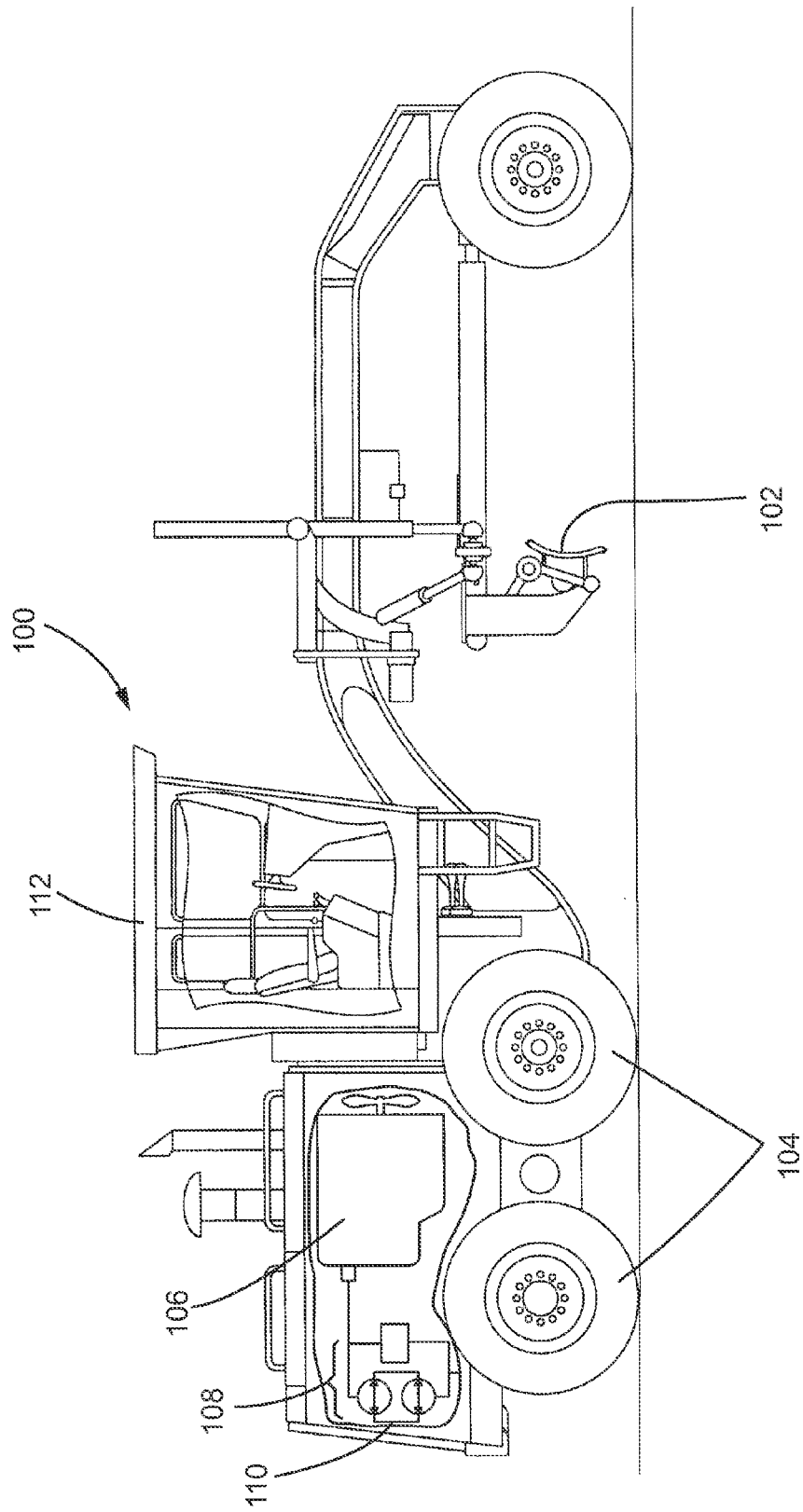
FIG. 1 is a diagrammatical, side elevational view of a mobile machine having a prime mover power source coupled to a driven element through an intermediate CVT.

Now referring to FIG. 1, wherein like reference numbers refer to like elements, there is illustrated an embodiment of a machine 100 and in particular a motor grater designed in accordance with the present disclosure. The machine 100 may be capable of alternating between high-speed, over-the-road travel and heavy, load-engaging operation. For example, the machine 100 may include a ground-engaging implement such as a blade 102 that may be power adjusted for flattening or smoothing a worksite surface. The machine 100 is suspended on ground engaging propulsion devices 104 such as wheels that may be disposed toward the front and the rear of the machine. In other machine embodiments, alternative propulsion devices 104 may include continuous tracks, belts, propellers, etc. To propel and direct the machine with respect to the ground, at least one set of wheels may be power-driven to rotate and another set may be steerable by an operator onboard, remotely, or by another control scheme.

Power for driving the wheels may be provided by a power source 106, sometimes referred to as a prime mover, that is disposed on the machine. A suitable example of a power source 106 is an internal combustion engine such as a compression ignition diesel engine that burns a hydrocarbon-based fuel or another combustible fuel source to convert the potential or chemical energy therein to mechanical power that may be utilized for other work. Other suitable types of power source 106 may include spark-ignition gasoline engines, turbines, hybrid engines, solar powered engines, and the like. To transfer the mechanical power produced by the power source 106 to the propulsion devices 104, the machine 100 may include a powertrain 108 operatively coupling the power source and the propulsion devices through an intermediate CVT 110. The powertrain 108 may also include various shafts, clutches, differentials, and other devices to transmit power and to assist in operation of the machine. Additionally, one or more power takeoffs (PTOs) may engage directly or indirectly with the powertrain 108 to redirect or retransmit a portion of the power to an auxiliary device such as the power actuated blade 102.

Figure 2:
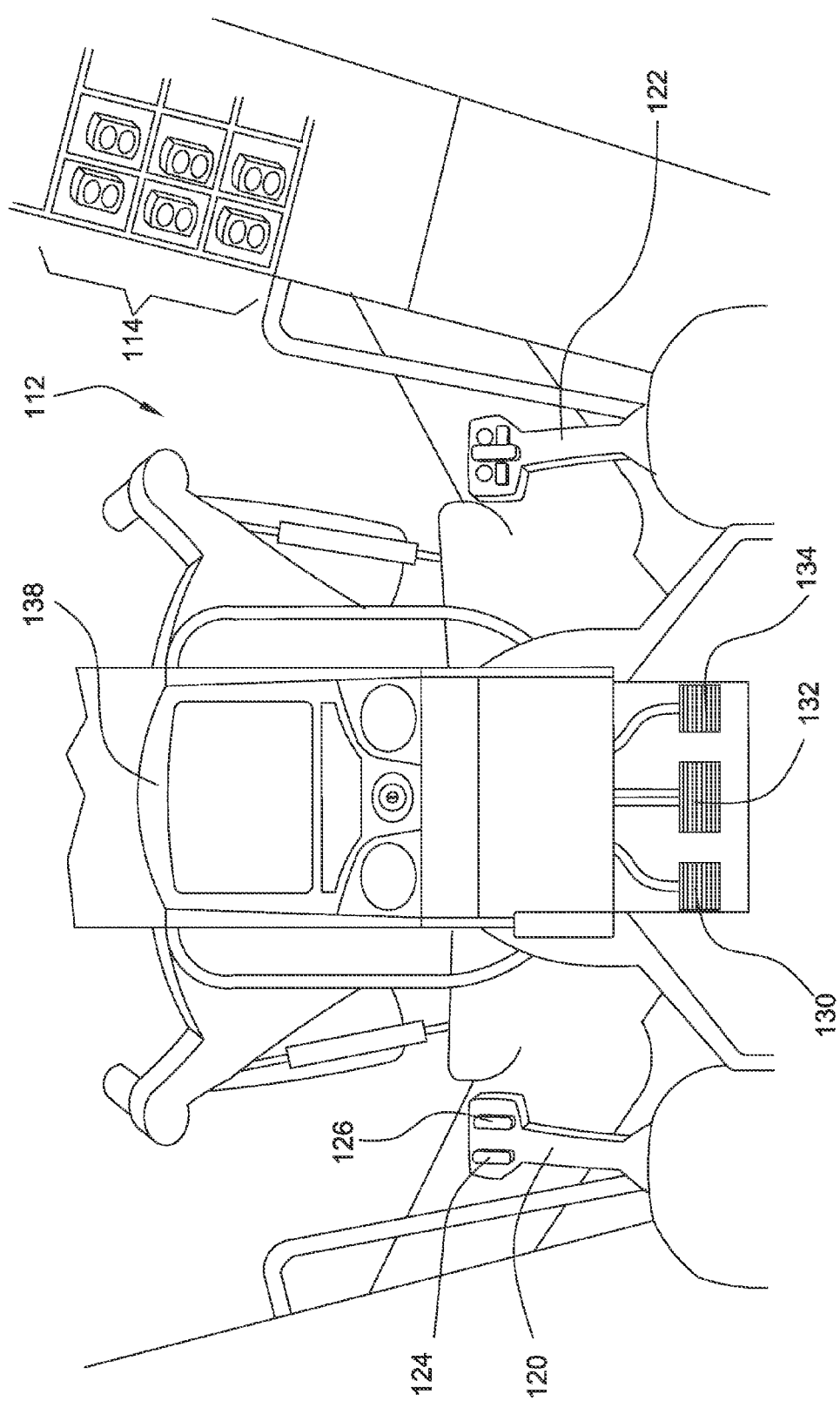
FIG. 2 is a fragmentary perspective view of an operator station of the machine including various accessible, operator-actuated controls and inputs for operating the machine.

To direct operation of the machine 100, an operator station 112 configured to accommodate an operator may be disposed on the machine in a location that allows visual command over the operating environment. Various controls and/or inputs 114 with which the operator may interact to maneuver and operate the machine 100 may be accessible inside the operator station 112. For example, referring to FIG. 2, the controls and/or inputs 114 may include a first control column or joystick 120 and a second joystick 122 disposed toward either side of the operator station 112 that the operator may grasp and manipulate to steer the machine 100 in a particular direction. In other embodiments, a steering wheel may be provided. A forward-neutral-reverse (F-N-R) selector 124 in the form of a toggle or switch for selecting a forward-neutral-reverse direction of the machine may be disposed in an accessible location, such as on the first joystick 120. A virtual gear shifter 126 in the form of a roller or slide switch may also be provided on the first joystick 120 to alter the perceived operation of the CVT by, for example, selection of different virtual gear ratios. Further, various other types of switches, buttons, knobs, dials, levers and the like may be included on the joysticks 120, 122 or at other accessible locations in the operator station 112.

Further adjustment of the machine's operation may be implemented through one or more pedals located toward the floor of the operator station 112. As is commonly known, an operator may depress or release a pedal through a range of displacement to bring about an expected response from the machine. Specifically, as in the illustrated embodiment, one or more of a left-oriented first pedal 130, center-oriented second pedal 132 and right-oriented third pedal 134 may be provided. For example, the first pedal 130 may be associated with a slip clutch that may engage and disengage various components in the powertrain 108. The second pedal 132 may be associated with a service break that may retard rotation of the powertrain 108. The right oriented, third pedal 134 may function as a throttle pedal that the operator may modulate for acceleration and/or de-acceleration so as to increase or decrease the speed or velocity of the machine.

To visually interact with the operator, a visual display 138 including a screen or monitor may be located in the operator station 112. The visual display 138 may display, for example, information regarding operating parameters, performance characteristics, conditions, and variables regarding various aspects of the machine's operation. Common display information may include speed, direction, power source revolutions-per-minute (RPM), engine load, fuel level, and the like. The visual display 138 may be any suitable type of display including a liquid crystal display (LCD), a cathode ray tube (CRT), a plasma display or the like. Additionally, the visual display 138 may be configured to receive input from the operator through touch-screen technology, soft buttons and so forth.

Figure 3:
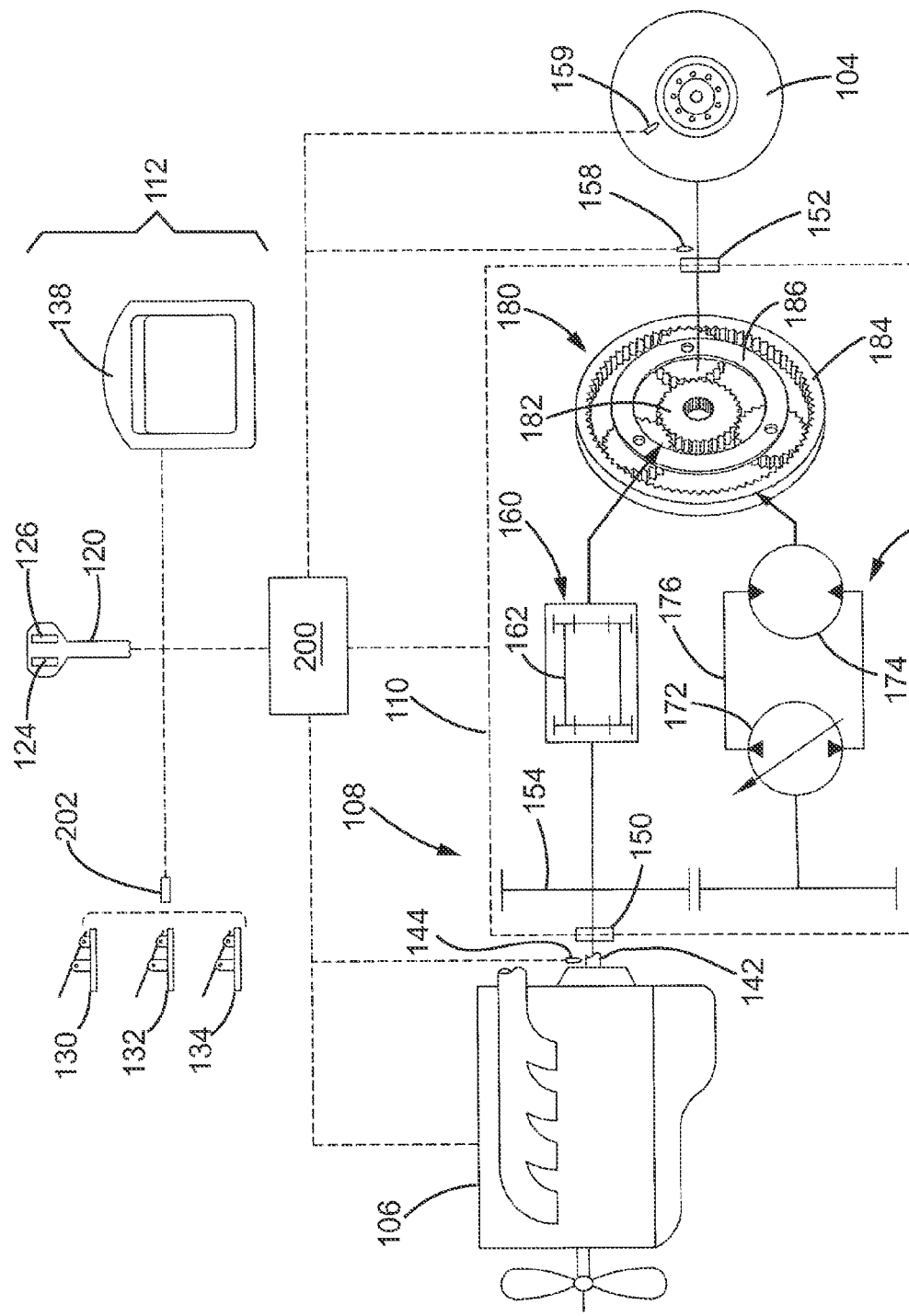
FIG. 3 is a schematic illustration of a powertrain of the machine including an embodiment of a CVT and a controller adapted to operate the CVT using a plurality of virtual gear ratios.

Referring to FIG. 3, an embodiment of the powertrain 108 for transferring mechanical power through the machine is illustrated in more detail. The prime mover power source 106, for example, a diesel-burning internal combustion engine, produces a rotational power output that may rotate a power source output 142, such as a drive shaft, extending from the power source. The speed and, in a somewhat related manner, the torque produced by the power source may be selectively varied. For example, considering a diesel-burning internal combustion engine, the speed and power output may be adjusted by increase or decreasing the quantity of fuel introduced and combusted in the engine, adjusting the displacement volume of the combustion chambers, etc. To measure, directly or indirectly, the rotational output speed produced by the power source 106, i.e., the power source speed, a power source sensor 144 may be associated with the power source output 142. By way of example, the power source sensor 144 may be a magnetic pickup type sensor that may sense a rotating magnetic field generated by a magnet associated with a rotating component of the power source output 142 such as the drive shaft, flywheel or the like. In other embodiments, the power source sensor 144 may be an optical pickup sensor that optical reads a visual indication on the rotating component. Other systems that may be associated with the power source 106 include fuel systems, air intake systems, exhaust systems, and the like.

To adjust the speed and/or torque of the rotational output produced by the power source 106, for example, by increasing speed and inversely affecting torque, the CVT 110 may be disposed down line of and operatively coupled to the power source output 142. As stated above, the CVT 110 may provide a continuous or infinite number of available torque-to-speed ratios for varying the output from the power source 106. In other words, the CVT 110, which is represented as a dashed-line box, may receive the rotational output though a CVT input member 150 associated with the power source output 142, and modify it in a controlled manner by changing the torque-to-speed ratio across a continuous range or spectrum before transmitting it through a CVT output member 152. To vary the torque-to-speed ratio, one or more operational characteristics of the CVT may be responsively controlled.

In the illustrated embodiment, the CVT 110 may be a split-path, hydromechanical CVT in which the rotational input from the CVT input member 150 is proportionally split into two parallel paths before being recombined at the CVT output member 152. The paths may include a mechanical power-transfer path 160 and a hydrostatic power-transfer path 170 disposed inside the CVT 110. To physically split the rotational input, a path splitter 154 coupled to a shaft of the CVT input member 150 may include a series of parallel, intermeshing gears that may duplicate and offset the rotational axis of the rotary input to align with either or both of the mechanical power-transfer path 160 and the hydrostatic power-transfer path 170.

The mechanical power-transfer path 160 may transfer the rotational power input from the CVT input member 150 to the CVT output member 152 by mechanical, dynamic techniques. For example, the mechanical power-transfer path 160 may embody a multispeed, bidirectional, mechanical transmission with various forward gears, reverse gears and/or clutches. The gears and/or clutches may be arranged in an adjustable and selectively engageable gear train 162 so that predetermined gear combinations may be engaged to produce a discrete output gear ratio. In this manner, the mechanical power-transfer path may function similarly to the traditional gear-based transmissions.

The hydrostatic power-transfer path 170 may transfer the rotational power output from the CVT input member 150 to the CVT output member 152 using fluid mechanics and hydraulics concepts. For example, the hydrostatic power-transfer path 170 may include a hydraulic pump 172 and a hydraulic motor 174 interconnected by a fluid transfer line 176 such as a flexible hydraulic hose that may channel hydraulic fluid. The hydraulic pump 172, which may be a variable displacement pump, swash plate, or the like, may be operatively coupled to the CVT input member 150 and may convert the rotary power input to hydraulic pressure by pressurizing the hydraulic fluid in the fluid transfer line 176. The fluid transfer line directs the pressurized hydraulic fluid to the hydraulic motor 174 to rotate an associated impeller or the like and reconvert the hydraulic pressure to a rotational output. A "gear ratio" or "effective gear ratio" of hydrostatic power-transfer path 170 may be altered by, for example, varying the displacement of the hydraulic pump 172 or changing the resistance of the fluid transfer line 176. Hydraulic displacement and/or resistance may be varied continuously within the operational limits of the CVT to provide an infinite number of effective gear ratios.

The outputs of the mechanical power-transfer path 160 and a hydrostatic power-transfer path 170 may be recombined using one or more gear assemblies operating in conjunction with the CVT output member 152. For example, the gear assemblies may include a planetary gear 180 including an inner sun gear 182, an outer ring gear 184, and an intermediary carrier 186 operatively engaged with each other. As will be appreciated by those of skill in the art, the interrelationship and the relative rotation of the various gears in a planetary gear may be adjusted to produce a variety of different outputs including reversible outputs. For example, the speed at which ring gear 184 rotates relative to a ground, and the speed at which carrier 186 rotates relative to ring gear 184, may determine a rotational speed of sun gear 182. Accordingly, any combined gear ratio may be achieved by varying the discrete gear ratio of the mechanical power-transfer path 160, the variable gear ratio of the hydrostatic power-transfer path 170, and recombining them at different selected relations in the planetary gear 180, thus changing the output torque and speed characteristics of the CVT 110.

In other embodiments, the CVT may be a purely mechanical CVT using a series of selectable, interrelated gear trains such at the gear train 162 in FIG. 3. The purely mechanical CVT may also be realized as a variable diameter friction pulley system including two or more, parallel, inverted cone-like pulleys interconnected by a belt. An actuator may axially displace the belt with respect to the parallel pulleys to align at different diameters thereby producing variable torque and speed outputs. In other embodiments, the CVT may be a purely hydrostatic CVT similar to the hydrostatic power-transfer path 170 in FIG. 3. Furthermore, the CVT may be an electrical-magnetic CVT including a generator-motor combination. The rotational input may drive the generator to produce electricity that drives the motor to reproduce the rotational output. To continuously vary the torque-to-speed ratio, the electrical resistance between the generator and motor may be adjusted in increasingly small increments. In other embodiments, any other suitable type of CVT may be used.

To measure the rotational output of the CVT 110, a CVT sensor 158, such as a magnet pickup sensor or an optical sensor, may be associated with the CVT output member 152 to sense the rotational speed produced. In another embodiment, the torque output of the CVT 110 may be determined by a sensor disposed in the fluid transfer line 176 that measures hydraulic pressure therein. The torque transfer through the CVT may then be estimated from the measured hydraulic pressure and any possible transmission losses or inefficiencies may be accounted for. The powertrain 108 may terminate at a propulsion device 104, such as a rotatable wheel that engages the ground and propels the machine. Various axels, differentials and the like may facilitate the engagement of the powertrain 108 to the wheel. To measure an actual machine speed a ground sensor or the like (not illustrated) may be provided. In the embodiment of FIG. 3, a machine speed sensor 159, such as a magnetic pickup or optical sensor, may be associated with the wheel. Machine speed, i.e., distance traveled per time, may be calculated by multiplying the revolutions per second of the wheel by the circumference of the wheel. In various embodiments, the machine speed sensor or another sensor may determine if the propulsion device is slipping or spinning out with respect to the ground.

To coordinate and control the various components in the powertrain 108 including the CVT 110, the machine may include an electronic or computerized control unit, module or controller 200. The controller 200 may be adapted to monitor various operating parameters and to responsively regulate various variables and functions affecting the powertrain. The controller 200 may include a microprocessor, an application specific integrated circuit (ASIC), or other appropriate circuitry and may have memory or other data storage capabilities. The controller may include functions, steps, routines, data tables, data maps, charts and the like saved in and executable from read-only memory or another electronically accessible storage medium to control the engine system. Storage or computer readable mediums may take the form of any media that provides instructions to the controller for execution. The mediums may take the form of non-volatile media, volatile media, and transmission media. Non-volatile media includes, for example, optical or magnetic disks. Volatile media includes dynamic memory. Transmission media includes coaxial cables, copper wire and fiber optics, and may also take the form of acoustic or light waves, such as those generated during radio-wave and infra-red data communications. Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer or processor may read. Although in FIG. 3, the controller 200 is illustrated as a single, discrete unit, in other embodiments, the controller and its functions may be distributed among a plurality of distinct and separate components. To receive operating parameters and send control commands or instructions, the controller may be operatively associated with and may communicate with various sensors and controls in the powertrain 108. Communication between the controller and the sensors may be established by sending and receiving digital or analog signals across electronic communication lines or communication busses. The various communication and command channels are indicated in dashed lines for illustration purposes.

For example, to monitor the output speed and/or torque produced by the power source 106, the controller 200 may communicate with the power source sensor 144. For the described internal combustion engine producing a rotational force, the monitored speed may be in revolutions per minute. Likewise, to monitor the changes to the torque-to-speed output affected by the CVT 110, the controller may communicate with the CVT sensor 158. The controller 200 may also determine or estimate the actual machine speed, regardless of transmission concerns in the powertrain 108, by directly communicating with the machine speed sensor 159 associated with the propulsion device 104.

To receive and communicate instructions or commands, the controller 200 further may be associated with the controls and visual display 138 in the operator station 112. For example, to increase and decrease machine speed, the controller may communicate with a pedal sensor 202 associated with and registering articulation of the first pedal 130, the second pedal 132 and particularly with the third pedal 134 intended as a throttle register located in the operator station 112. Accordingly, an operator may command a desired increase or decrease in machine speed to the controller 200 by modulating the third pedal 134. To cause a speed increase or decrease in the powertrain 108, the controller 200 may adjust the operating characteristics of the power source 106 and/or the CVT 110. For example, in embodiments utilizing a diesel-burning engine as a power source 106, the controller 200 may direct that additional fuel be introduced to the combustion chambers of the power source to increase the power source output RPM if it senses that the third pedal 134 is completely or partially depressed. Alternatively or in addition to adjusting the power source 106, the controller may change or adjust the torque-to-speed output of the CVT 110 by, for instance, reconfiguring the effective gear ratios produced by the combination of the mechanical power-transfer path 160 and the hydrostatic power-transfer path 170.

Although the machine 100 is capable of operating continuously across its full range of machine speeds by adjusting the engine output and/or CVT output, the controller 200 may regulate the output speed and/or torque of the CVT 110 within discrete ranges by associating those ranges with a plurality of virtual gear ratios. Each virtual gear ratio may be associated with a minimum virtual gear speed and a respective maximum virtual gear speed. For operator convenience and familiarity, the virtual gear ratios may correspond to the speed ranges of conventional, gear-based transmissions. When the operator selects a specific virtual gear ratio, the controller 200 may restrict the output speed of the CVT within the allowable minimum virtual gear speed and maximum virtual gear speed. Additionally, the output torque may be indirectly controlled by selection of a particular virtual gear ratio.

To enable operator selection of a particular virtual gear ratio, the controller 200 may communicate with the virtual gear shifter 126 on the first joystick 120 that may enable shifting between a plurality of virtual gear ratios. For example, the plurality of virtual gear ratios may include gears (1) through (8) that correspond to discrete ranges of increasingly higher and overlapping minimum and maximum speeds. In a specific embodiment, virtual gear ratio (1) may correspond to an intended machine speed of between 0 and 10 kilometers per hour (kph) while virtual gear ratio (2) may correspond to an intended machine speed of between 4 and 16 kilometers per hour. Because of the overlap, the operator may "shift" or transition between virtual gear ratio (1) and virtual gear ratio (2) and according increase or decrease the available output of the CVT. Virtual gear ratio (8) may correspond to an intended maximum speed of the machine, e.g., 50 kph. Additionally, virtual gear shifter 126 may work in cooperation with the F-R-N selector 124 to select a plurality of virtual gear ratios associated with a reverse direction of the machine. In further embodiments, for example, different numbers of virtual gear ratios may be employed including fractions of discrete virtual gear ratios.

When an operator selects a specific virtual gear ratio, operation of the machine may typically occur within an expected range of machine speeds and related torque capacities. The operator may selectively change these characteristics as the operational requirements of the machine change, such as if the machine begins climbing or descending a grade or engages a load. The controller may be configured to operate the machine within the limits accorded to the selected virtual gear ratio. However, in some instances, the actual output produced by the machine may not accurately correspond with the selected virtual gear ratio. For example, the power source 106 and/or the CVT 110 may be underperforming or over-performing based on operational requirements or conditions. To determine if an inconsistency between actual and virtual conditions exist, the controller 200 may be configured to calculate a calculated virtual gear ratio based on, for example, the actual machine speed or some other actual or calculated condition being realized by the machine. The calculated virtual gear ratio is determined independently of the selected virtual gear ratio selected by the operator or the desired (but not actual) machine speed and therefore reflects the true operating conditions of the engine.

Figure 4:
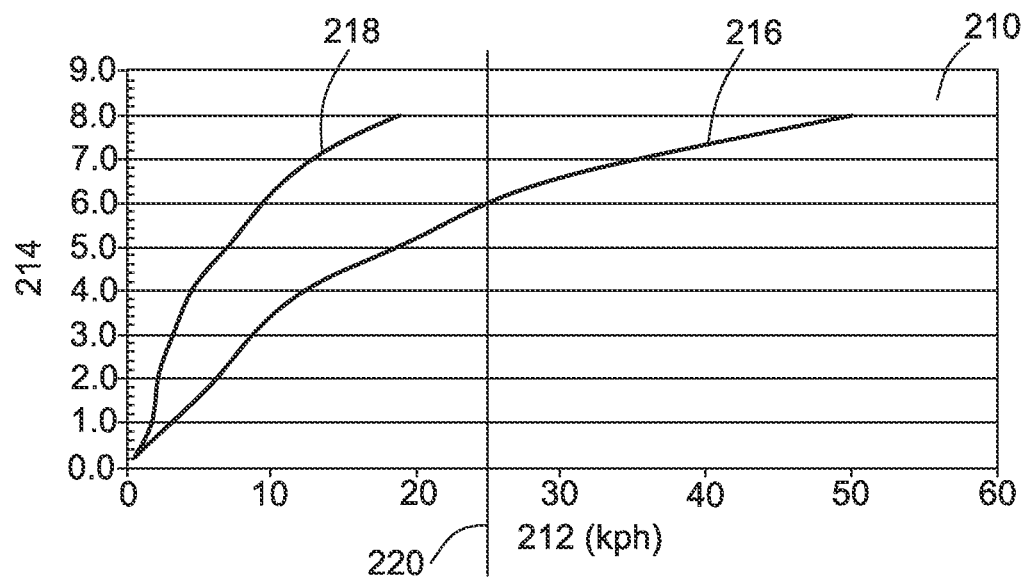
FIG. 4 is an illustration of an embodiment of a control map or table for determining a calculated virtual gear ratio based on a measured machine speed.

For example, an accurate, actual machine speed may be known by querying the machine speed sensor 159. To facilitate conversion of the machine speed to a calculated virtual gear ratio, the controller may be programmed with one or more reverse lookup tables, charts or maps such as the machine speed-to-virtual gear table 210 illustrated in FIG. 4. According to the machine speed-to-virtual gear table 210, machine speed in, for example, kilometers per hour is measured along the X-axis 212 and the plurality of available virtual gear ratios, i.e., (1)-(8), are charted along the Y-axis 214. To establish a reference between the two variables, a high speed reference line 216 and a low speed reference line 218 are charted through the machine speed-to-virtual gear table 210. The high speed reference line 216 may be developed based on the expected or theoretical machine speed associated with the high idle or maximum output speed of the power source at each virtual gear ratio. In other words, when the power source is fully throttled, each virtual gear ratio will produce an expected maximum virtual gear speed, for example, as was known with respect to conventional gear-based transmissions. Likewise, the low speed reference line 218 may be based on the expected machine speed produced at low idle or the minimum output speed of the power source at each virtual gear ratio. In the illustrated embodiment, the high speed reference line 216 and the low speed reference line 218 are continuous curves, but in other embodiments could appear as step-like curves or lines.

In the present embodiment, the controller may reference the high speed reference line 216 in the machine speed-to-virtual gear table 210 to determine the calculated virtual gear ratio. For example, if the measured machine speed is 25 kph, as indicated by line 220, the controller may locate that value on the X-axis 212 and plot from the 25 kph coordinate to the high speed reference line 216. The intersection of the 25 kph coordinated, as indicated by the intersection of line 220 and the high speed reference line 216, enables the controller to extract the corresponding virtual gear ratio which, for the example, results in a calculated virtual gear ratio of (6). In other words, a virtual gear ratio of (6) is theoretically appropriate to operate a machine at 25 kph when the power source or engine is operating at its full throttle or maximum power source speed. The reverse lookup machine speed-to-virtual gear table 210, thus, works backwards from the actual conditions the machine experiences to determine a theoretically appropriate calculated virtual gear ratio. Further, the machine speed-to-virtual gear table 210 determines that the calculated virtual gear ratio (6) is appropriate regardless of the selected virtual gear ratio or the desired machine speed indicated by the operator.

Figure 5:
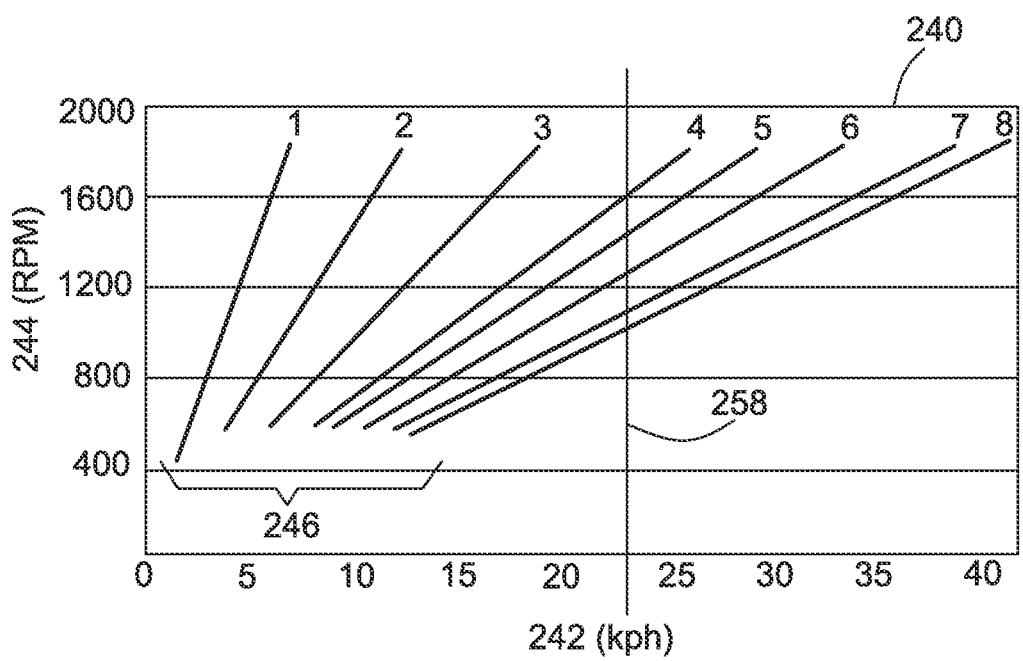
FIG. 5 is an illustration of another embodiment of a control map or table for determining a calculated virtual gear ratio based on a measured machine speed.

Referring to FIG. 5, there is illustrated an alternative embodiment of a reverse lookup table, chart or map that may be used to determined a calculated virtual gear ratio based on a measured actual machine speed. The illustrated chart is a machine speed-to-power source speed table 240. In the reverse lookup machine speed-to-power-source speed table 240, the measured machine speed is plotted along the X-axis 242 and the output speed in RPM of the power source, such as an internal combustion engine, is plotted along the Y-axis 244. By way of example only, the minimum and maximum power source speed may be limited between about 400 RPM and about 1800 RPM. Reference between the machine speed and the engine speed may be established by plotting angled lines 246 corresponding to each of the plurality of virtual gear ratios, e.g., (1)-(8). The higher virtual gear ratios have larger and higher corresponding machine speeds with adjacent ratios partially overlapping. In the illustrated embodiment, as the output speed of the power source increases from a minimum to a maximum, each virtual gear ratio will result in increasingly higher machine speeds, much like conventional gear-based transmissions.

To determine the calculated virtual gear ratio using the machine speed-to-power source speed table 240, the controller may locate the measured machine speed on the X-axis 242, e.g., 25 kph as indicated by line 258. From that coordinate, the controller may plot to the lowest possible virtual gear ratio corresponding to the measured speed, e.g., calculated virtual gear ratio (4). By referencing the lowest possible virtual gear ratio, even if higher virtual gear ratios such as (5)-(8) may also correspond to the measured speed coordinate, the machine speed-to-power source speed table 240 is also referencing the maximum output speed of the power source that may produce the measured machine speed. Thus, the machine speed-to-power source speed table 240 is another way of referencing a high idle condition or maximum speed of the power source to determine a calculated virtual gear ratio. Further, the table 250 may determine the calculated virtual gear ratio independently of the selected virtual gear ratio or desired power source output speed.

INDUSTRIAL APPLICABILITY

Figure 6:
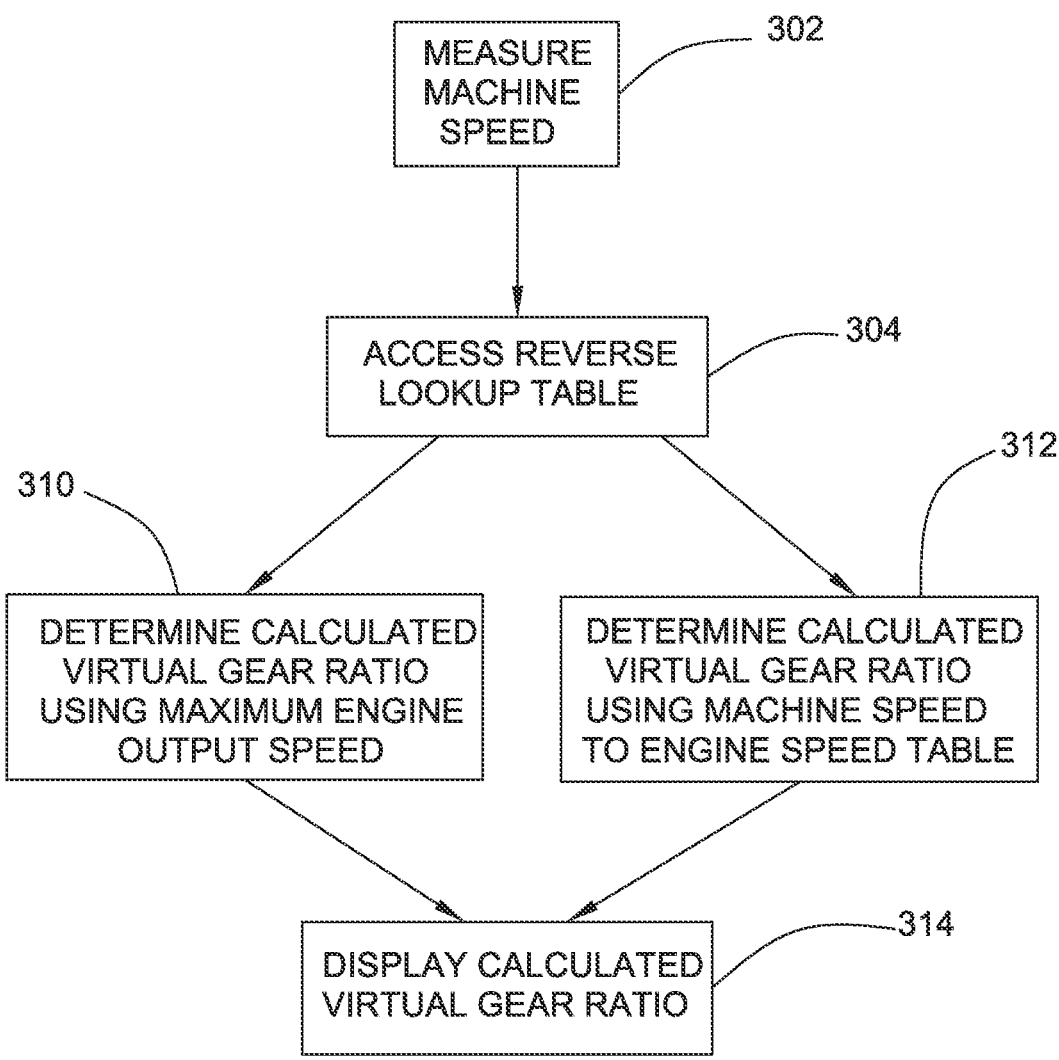
FIG. 6 is a flowchart illustrating a possible routine or process for calculating a calculated virtual gear ratio.

In accordance with the aspect of the disclosure a calculated virtual gear ratio may be determined based on actual machine operating conditions, rather than an independent of operator-selected parameters. The methodology may facilitate operation of any suitable machine utilizing a CVT and virtual gear ratios. Referring to FIG. 6, there is illustrated a flowchart or process 300 that may be performed by a controller such as the one described with respect to FIG. 3. In an initial measurement step 302, the process 300 determines an actual machine speed with respect to the ground by, for example, communicating with the machine speed sensor 159 associated with the propulsion device 104. The measured machine speed may reflect increases or decreases due, for example, to the machine encountering declining or inclining grades at a worksite. The process 300 in an access step 304 may access a reverse lookup table electronically stored in the controller 200 to determine the calculated virtual gear ratio based on the measured machine speed. If the reverse lookup table is similar to the machine speed-to-virtual gear table 210 in FIG. 4, the process may perform a first calculation step 310 that uses the maximum power source output speed to reference a calculated virtual gear ratio. If the reverse lookup table is similar to the machine speed-to-power source speed table 250 in FIG. 5, the process may perform an alternative second calculation step 312 to reference a lowest possible virtual gear ratio as the calculated virtual gear ratio. To communicate the calculated virtual gear ratio to the operator, the process 300 may perform a display step 314 displaying the calculated virtual gear ratio on the visual display 138 in the operator station 112 of FIG. 2.

Figure 7:
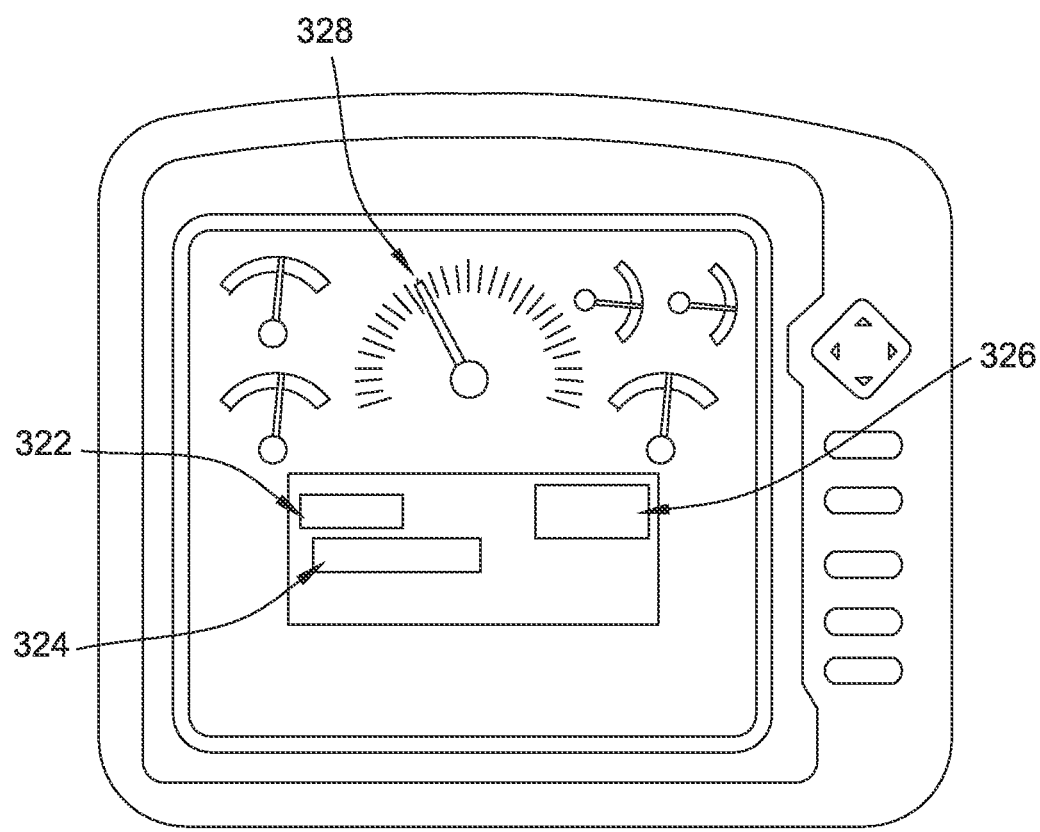
FIG. 7 is an illustration of an embodiment of a screenshot from a visual display included in the operator station of FIG. 2.

Referring to FIG. 7, in an embodiment of a screenshot 320 that may appear on the visual display, the calculated virtual gear ratio 322 may be presented with other operating parameters related to the CVT and machine, such as the selected virtual gear ratio 324, the measured machine speed 326, the power source speed in RPM 328, and the like. By providing this information to the operator for reference, the displayed screenshot 320 facilitates operation of the machine. For example, comparison of the selected and calculated virtual gear ratios may indicate how accurately the machine is tracking the selected virtual gear ratio. If the machine is performing accurately, the selected and calculated virtual gear ratios should match, but if the machine is underperforming, the selected virtual gear ratio will be larger than the calculated ratio. For example, referring to FIG. 4, even if the machine is traveling at 25 kph, the selected virtual gear ratio may be (7) or (8). Using the reverse lookup machine speed-to-virtual gear table 210, however, the calculated virtual gear ratio will be (6). This may indicate to the operator that the machine could downshift to a lower virtual gear ratio, possibly to increase torque or improve fuel efficiency. Similarly, the calculated virtual gear ratio, by referencing the maximum virtual gear ratio speed, could indicate that the selected virtual gear ratio is capable of a range of increasingly higher speeds before upshifting virtual gear ratios is required. Thus, the operator may know the theoretically appropriate virtual gear ratio for the actual conditions the machine is experiencing and may adjust the machine accordingly. If the selected and calculated virtual gear ratios match, though, that indicates that power source and/or CVT are operating at full capacity for the selected gear ratio and that any desired increase in speed or torque will require shifting to the next highest virtual gear ratio. Thus, the operator may also have an understanding of the machine capabilities and limitations within each selected virtual gear ratio.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A machine comprising:
a continuously variable transmission (CVT);
a machine speed sensor for determining a measured machine speed;
a virtual gear shifter enabling operator selection of a selected virtual gear ratio from among a plurality of virtual gear ratios associated with the CVT; and
a controller in communication with the CVT and the machine speed sensor, the controller including a reverse look-up table relating the measured machine speed to the plurality of virtual gear ratios associated with the CVT, the controller further configured to determine a calculated virtual gear ratio using the reverse look-up table and the measured machine speed and further to compare the calculated virtual gear ratio to the selected virtual gear ratio, and
a visual display in communication with the controller for displaying the calculated virtual gear ratio and the selected virtual gear ratio and for comparison.

2. The machine of claim 1, wherein the visual display is further configured to display the measured machine speed.

3. The machine of claim 1, wherein each virtual gear ratio of the plurality of virtual gear ratios has an associated minimum virtual gear speed and an associated maximum virtual gear speed.

4. The machine of claim 3, wherein the reverse look-up table includes at least the maximum virtual gear speed for each virtual gear ratio; and the controller determines the calculated virtual gear ratio by comparing the measured machine speed with the maximum virtual gear speeds.

5. The machine of claim 3, wherein the reverse look-up table includes speed ranges between the minimum virtual gear speed and the maximum virtual gear speed for each virtual gear ratio, and the controller determines the calculated virtual gear ratio by selecting the lowest possible virtual gear ratio having a speed range including the measured machine speed.

6. The machine of claim 1, wherein the CVT is operatively coupled to a power source.

7. A method of operating a machine having a power source operatively coupled to a continuously variable transmission (CVT), the method comprising:
selecting a selected virtual gear ratio from a plurality of virtual gear ratios associated with the CVT;
operating the machine in accordance with the selected virtual gear ratio;
measuring a measured machine speed;
comparing the measured machine speed to a plurality of virtual gear ratios in a reverse look-up table to determine a calculated virtual gear ratio,
comparing the calculated virtual gear ratio to the selected virtual gear ratio to determine gear ratio accuracy, and
displaying the calculated virtual gear ratio and the selected virtual gear ratio on a display screen for comparison.

8. The method of claim 7, wherein each virtual gear ratio of the plurality of virtual gear ratios has an associated minimum virtual gear speed and an associated maximum virtual gear speed.

9. The method of claim 8, wherein the reverse look-up table includes at least the maximum virtual gear speed for each virtual gear ratio; and the step of comparing the measured machine speed with the maximum virtual gear speeds to determine the calculated virtual gear ratio.

10. The method of claim 8, wherein the reverse look-up table includes speed ranges between the minimum virtual gear speed and the maximum virtual gear speed for each virtual gear ratio, and step of comparing selects the lowest possible virtual gear ratio having a speed range including the measured machine speed.

11. The method of claim 7, wherein the calculated virtual gear ratio will be less than the selected virtual gear ratio if the measured machine speed is less than the maximum virtual gear speed for the selected virtual gear ratio.

12. The method of claim 7, wherein a machine speed sensor is operatively associated with a propulsion device of the machine for measuring the measured machine speed.

13. A controller for controlling a machine including a continuously variable transmission (CVT), the controller comprising:
a communication link to a machine speed sensor measuring a measured machine speed;
data for a plurality of virtual gear ratios, each virtual gear ratio having an associated minimum virtual gear speed and an associated maximum virtual gear speed;

a reverse lookup table correlating the measured machine speed to the plurality of virtual gear ratios to determine a calculated virtual gear ratio by referencing the maximum virtual gear speed, the controller further configured to compare the calculated virtual gear ratio to a selected virtual gear ratio to determine gear ratio accuracy, and to instruct a visual display linked to the controller to display the calculated virtual gear ratio and the selected virtual gear ratio.

* * * * *